US011489731B2

(12) United States Patent
Walsh et al.

(10) Patent No.: US 11,489,731 B2
(45) Date of Patent: Nov. 1, 2022

(54) TECHNIQUES AND ARCHITECTURES FOR EFFICIENT ALLOCATION OF UNDER-UTILIZED RESOURCES (71) Applicant: salesforce.com, inc., San Francisco, CA (US)

(72) Inventors: James E. Walsh, Woodinville, WA (US); Sameer Tiwari, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/282,322

(22) Filed: Sep. 30, 2016

(65) Prior Publication Data
US 2018/0097702 A1 Apr. 5, 2018

(51) Int. Cl.
H04L 43/0876 (2022.01)
H04L 41/14 (2022.01)
H04L 47/70 (2022.01)
H04L 67/02 (2022.01)
H04L 67/10 (2022.01)
H04L 67/568 (2022.01)

(52) U.S. Cl.
CPC .......... H04L 41/14 (2013.01); H04L 43/0876 (2013.01); H04L 47/822 (2013.01); H04L 47/823 (2013.01); H04L 67/02 (2013.01); H04L 67/10 (2013.01); H04L 67/568 (2022.05)

(58) Field of Classification Search
CPC ..... H04L 41/14; H04L 43/0876; H04L 67/02; H04L 67/10; H04L 67/2842; H04L 41/0896; H04L 47/70; H04L 67/1008; G06F 9/50
See application file for complete search history.

(56) References Cited

U.S. PATENT DOCUMENTS 5,577,188 A    11/1996  Zhu
5,608,872 A    3/1997   Schwartz et al.
5,649,104 A    7/1997   Carleton et al.
5,715,450 A    2/1998   Ambrose et al.
5,761,419 A    6/1998   Schwartz et al.
(Continued)

FOREIGN PATENT DOCUMENTS

WO         2017010922 A1    1/2017

OTHER PUBLICATIONS

Non-Final Office Action for U.S. Appl. No. 15/282,335 dated May 14, 2018, 8 pages.
(Continued)

Primary Examiner — Lesa M Kennedy
(74) Attorney, Agent, or Firm — Kwan & Olynick LLP (57) ABSTRACT In a computing environment, a set of executing processes each having associated resources are provided. Aggregate resources for the computing environment include multiple different types of resources. A utilization level for each of the resources within the computing environment is evaluated to determine an unconsumed capacity for each of the resources below a utilization threshold. The utilization threshold is resource-dependent. An indication of at least a portion of unconsumed capacity for each of the resources below the utilization threshold is gathered. The unconsumed portion for each of the resources below the utilization threshold is exposed for consumption by other executing processes.

18 Claims, 6 Drawing Sheets

(56) References Cited

U.S. PATENT DOCUMENTS

| | | | |
|---|---|---|---|
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 8,104,039 B2 | 1/2012 | Huizenga |
| 8,108,869 B2 | 1/2012 | Jackson |
| 8,108,872 B1 | 1/2012 | Lindholm et al. |
| 8,301,772 B2 | 10/2012 | Zeis et al. |
| 8,505,022 B2 | 8/2013 | Helander |
| 8,667,496 B2 | 3/2014 | Levin |
| 8,874,747 B2 | 10/2014 | Boldyrev et al. |
| 9,069,610 B2 | 6/2015 | Chakravorty et al. |
| 9,953,276 B2 | 4/2018 | Gaurav et al. |
| 10,838,770 B2 | 11/2020 | Nutter et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0053011 A1 | 5/2002 | Aiken et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0184287 A1 | 8/2006 | Belady et al. |
| 2007/0250838 A1* | 10/2007 | Belady ............... G06F 11/3452 |
| | | 714/E11.197 |
| 2008/0001329 A1 | 1/2008 | Vannimwegen |
| 2008/0013829 A1 | 1/2008 | Stebbings |
| 2009/0025004 A1 | 1/2009 | Barnard et al. |
| 2009/0177744 A1 | 7/2009 | Marlow et al. |
| 2011/0145392 A1* | 6/2011 | Dawson ............... G06F 9/5072 |
| | | 709/224 |
| 2012/0131180 A1 | 5/2012 | Nomura et al. |
| 2012/0174097 A1 | 7/2012 | Levin |
| 2012/0265881 A1 | 10/2012 | Chen et al. |
| 2012/0290725 A1* | 11/2012 | Podila ................. G06F 9/5011 |
| | | 709/226 |
| 2013/0086129 A1 | 4/2013 | Brown et al. |
| 2013/0086235 A1 | 4/2013 | Ferris |
| 2013/0117762 A1 | 5/2013 | Yamashita et al. |
| 2013/0304903 A1* | 11/2013 | Mick .................. H04L 43/0817 |
| | | 709/224 |
| 2013/0346969 A1 | 12/2013 | Shanmuganathan et al. |
| 2014/0007097 A1 | 1/2014 | Chin et al. |
| 2014/0025890 A1 | 1/2014 | Bert et al. |
| 2014/0068335 A1 | 3/2014 | Bromley et al. |
| 2014/0325149 A1* | 10/2014 | Misra ................... G06F 3/0619 |
| | | 711/114 |
| 2014/0359356 A1 | 12/2014 | Aoki |
| 2014/0380307 A1 | 12/2014 | Zhu et al. |
| 2015/0355943 A1 | 12/2015 | Harris et al. |
| 2016/0098297 A1* | 4/2016 | Yuyitung ............ G06F 11/3447 |
| | | 718/104 |

(56) References Cited

U.S. PATENT DOCUMENTS

| | | |
|---|---|---|
| 2016/0274314 A1 | 9/2016 | Sasaki |
| 2016/0274814 A1 | 9/2016 | Zhang et al. |
| 2016/0306672 A1 | 10/2016 | Chin et al. |
| 2016/0330137 A1 | 11/2016 | Avci |
| 2017/0031719 A1 | 2/2017 | Clark et al. |
| 2017/0373988 A1 | 12/2017 | Soffe |
| 2018/0006903 A1 | 1/2018 | Ganguli et al. |
| 2018/0095664 A1 | 4/2018 | Walsh et al. |
| 2018/0097702 A1 | 4/2018 | Walsh et al. |
| 2018/0143852 A1 | 5/2018 | Ballantyne et al. |
| 2019/0155651 A1 | 5/2019 | Gilfedder et al. |
| 2020/0042338 A1 | 2/2020 | Poothia et al. |

OTHER PUBLICATIONS

Non-Final Office Action for U.S. Appl. No. 15/282,341 dated Jul. 26, 2018, 22 pages.
Final Office Action for U.S. Appl. No. 15/282,335 dated Sep. 26, 2018, 9 pages.
Final Office Action for U.S. Appl. No. 15/282,335 dated Aug. 16, 2019, 9 pages.
Non-Final Office Action for U.S. Appl. No. 15/282,341 dated Sep. 5, 2019, 21 pages.
Final Office Action for U.S. Appl. No. 15/282,341 dated Apr. 2, 2019, 24 pages.
Non-Final Office Action for U.S. Appl. No. 15/282,335 dated Mar. 21, 2019, 8 pages.
Final Office Action for U.S. Appl. No. 15/282,335 dated Mar. 30, 2020, 11 pages.
Non-Final Office Action for U.S. Appl. No. 15/282,341 dated Jun. 25, 2020, 27 pages.
Final Office Action for U.S. Appl. No. 15/282,341 dated Jan. 24, 2020, 30 pages.
Non-Final Office Action for U.S. Appl. No. 15/282,335 dated Dec. 13, 2019, 9 pages.
Notice of Allowance for U.S. Appl. No. 15/282,341 dated Dec. 1, 2020, 16 pages.
Non-Final Office Action for U.S. Appl. No. 15/282,335 dated Jan. 7, 2021, 13 pages.
Office Action (Non-Final Rejection) dated Mar. 3, 2022 for U.S. Appl. No. 15/282,335 (pp. 1-11).

* cited by examiner

TECHNIQUES AND ARCHITECTURES FOR EFFICIENT ALLOCATION OF UNDER-UTILIZED RESOURCES

TECHNICAL FIELD

Embodiments relate to efficient utilization of resources. More particularly, embodiments relate to techniques for efficiently identifying non-utilized (or under-utilized) resources to be allocated for more efficient utilization. For example, in a multitenant environment, systems may be designed to satisfy peak loads, which results in underutilized capacity during non-peak periods.

BACKGROUND

Computing environments often include resources that are not fully utilized during normal operating conditions. For example, in a multitenant environment resources (e.g., processor capacity, memory space, bandwidth, cache memory access, database service) can be designed and allocated based on anticipated peak loads. However, during normal operation, many of these resources may be unused or lightly used. Thus, there may exist valuable resources that are not utilized as efficiently as possible.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

In data centers and other environments in which computing resources are provided, maximizing host utilization is important for running a highly efficient service/business. While the examples that follow may focus on four main components (processor, memory, storage, network), the techniques described herein are applicable to other resources as well. During normal operation, there may be unutilized capacity across one or more resources.

Described herein are techniques to make unused and/or underutilized resources available for other purposes. In various embodiments, this can be accomplished without impacting the native/existing processes running on the host. In one embodiment, the host can both allocate and free resources based on monitoring, projection and/or back off strategies.

In one embodiment, the system predicts a load on a host based on, for example, ad hoc and/or machine learned data. In one embodiment, this is performed by a load predictor or other entity. In one embodiment, the system can take inputs from the load predictor to allocate and/or free resources without impacting native processes. In one embodiment, this is performed by a resource allocator or other entity.

As an example, a typical website is provided by servers backed by a database. Under normal operating conditions, the servers function to serve many HTTP requests, but may not be accessing local storage devices (e.g., hard drives, SSD drives) at a high level of utilization. With web servers, the traffic usually tends to be bursty and mostly network bound, though some processor capacity will be used. In this example, local storage devices can be exposed as available for other processes to utilize.

In one embodiment, monitoring and/or exposing of under-utilized and/or unutilized resources can be run as a service agent on each host, which could be spread across one or multiple processes to expose available resources for other systems/processes to consume.

In one embodiment, a load predictor (load prediction agent) operates on a per host basis and uses offline and/or online analytics and/or machine learning techniques to predict resource usage of the host for a finite interval in the future. In one embodiment, these metrics are sent to another system that is capable of providing analytics analysis functionality. In one embodiment, one or more application program interfaces (APIs) can be provided to share data. In one embodiment, the usage can be predicted based on this analysis.

In one embodiment, each host can run a daemon/thread that is a resource allocator that can function to allocate resources based on pre-configured heuristics, lookup tables, and/or configurations, etc. In one embodiment, resource allocation can be provided by an agent on each host, which can function as building blocks upon which large scale resource systems can be built.

In one embodiment, the resource allocator takes inputs from the load predictor (discussed above) and allocates, frees and/or otherwise makes available resources to higher level consumers. In one embodiment, this can include taking resources from lower level consumers and providing those resources to higher level consumers. This architecture is capable of gracefully handling unpredicted loads on the host system with minimal (or no) impact on the native processes/threads.

In one embodiment, each resource allocator receives input from the load prediction mechanism(s) at regular intervals. The resource allocators also validate resource availability for the resources corresponding to the resource allocator. The resource allocator can then allocate resources (e.g., storage, cache, processing, bandwidth).

The resources that are to be allocated to remote threads/processes are then exposed in a well-defined way. Various techniques for exposing available resources are discussed in greater detail below. In one embodiment, there is provided a back off feature that can be based on inputs from the prediction agent and/or an explicit call/input that can cause this allocation to be backed off.

Figure 1:
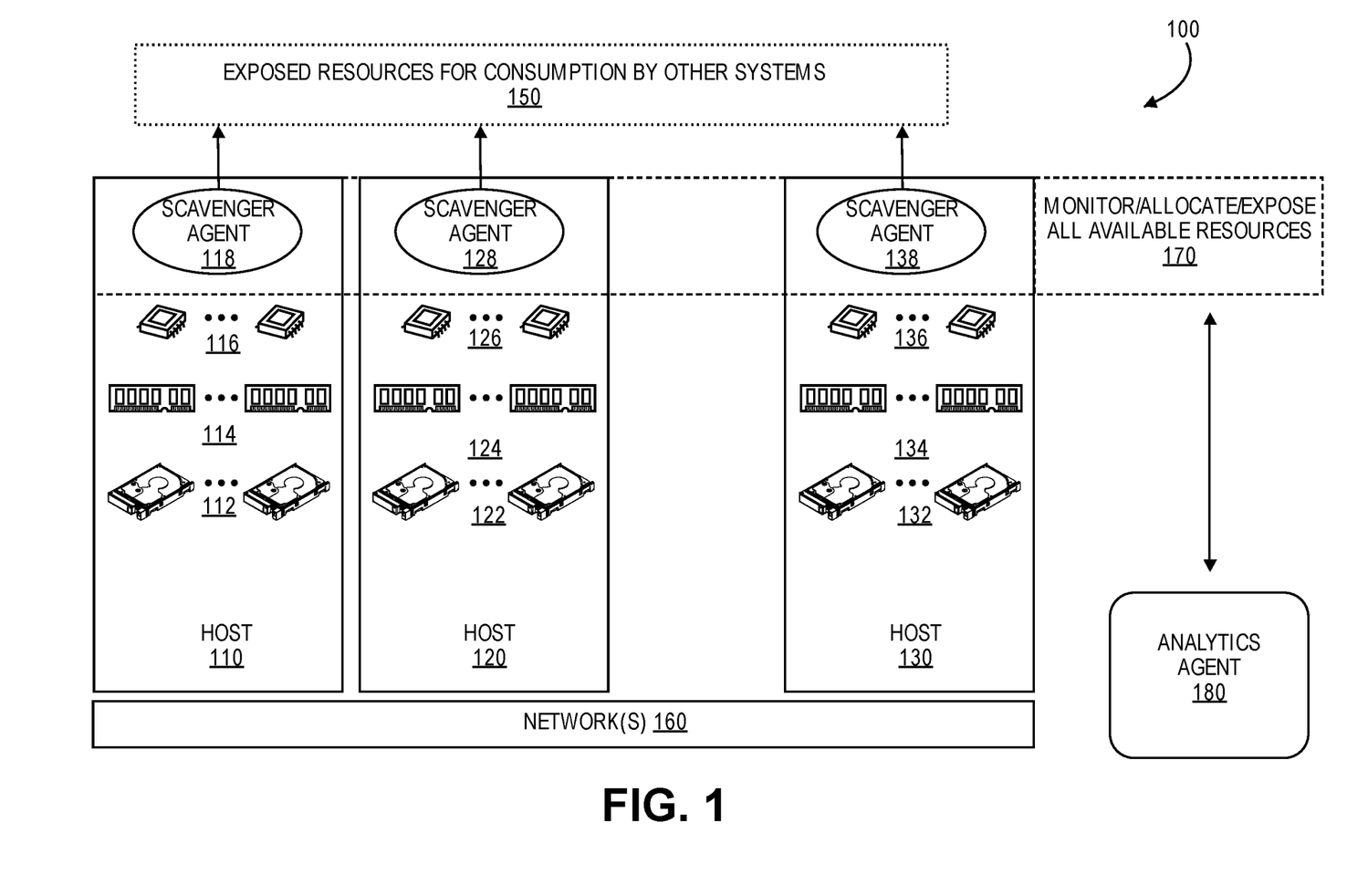
FIG. 1 is a block diagram of one embodiment of an architecture that can provide efficient allocation of under-utilized resources as described herein.

FIG. 1 is a block diagram of one embodiment of an architecture 100 that can provide efficient allocation of under-utilized resources as described herein. The example of FIG. 1 includes three host systems (110, 120, 130); however, any number of host systems can be supported. Further, the example of FIG. 1 illustrates only memory/storage resources that can be exposed for consumption by other systems 150; however, the example of FIG. 1 provides a basic example of the techniques described herein and not an exhaustive listing of possible uses. As described elsewhere in the present description, many types of resources can be exposed and/or reallocated as described herein.

Host systems 110, 120, 130 can be any type of computing platform having one or more resources that may be under-utilized. Host systems 11,0, 120, 130 can be interconnected by one or more networks 160 that can be any combination of wired and/or wireless networks.

While the example of FIG. 1 illustrates three systems that appear the same, the various resources may have different characteristics in different host systems. For example, the disk drives 112 of host 110 may have different characteristics (e.g., storage capacity, speed, bandwidth, reliability, energy consumption, available capacity), which may be the same or different than the disk drives (122, 132, respectively) of hosts 120, 130. Similarly, cache memory (114, 124, 134) and solid state drives (SSDs) 116, 126, 136 can have varying characteristics.

In one embodiment, each host system has an embedded scavenger agent (118, 128, 138) that functions to monitor and/or evaluate the utilization of one or more resources within the corresponding host system. In one embodiment, scavenger agents 118, 128, 138 have some control or influence over allocation of resources within the respective host systems. For example, if scavenger agent 128 determines that 50% of cache memory 124 is being utilized by host system 120, scavenger agent 128 can specify 50% (plus some buffer amount, for example, +5%, +10%) to be allocated to host system 120 and the remaining portion (e.g., 45%, 40%) can be exposed for use by other systems, for example, host 110 and/or host 130.

In one embodiment, each scavenger agent further functions to expose, advertise and/or otherwise indicate resources that are available in the host systems monitored by the respective scavenger agents. In one embodiment, a monitoring agent/entity 170 external to the host systems can collect information from one or more of the scavenger agents. In alternate embodiments, monitoring agent 170 can be provided by one or more of the host systems.

In one embodiment, unused resources and/or under-utilized resources can be exposed by the scavenger agents to allow other host systems to use these resources. Various techniques can be utilized to expose/advertise the availability of these resources. For example, a single listing or entity can provide identification and/or capacity available from other resources. A listing can be, for example, a table in a database, an XML file, etc. An agent/daemon/thread/entity can be responsible for managing information related to available scavenged resources and/or matching the resources to requests for additional resources.

In one embodiment, monitoring agent 170 can function to collect information from the various scavenging agents to expose all available resources to all (or a subset) of the host systems within a larger environment. For example, host systems 110, 120, 130 can be part of an on-demand services environment that functions to provide services to various users. An on-demand services environment can be, for example, a multitenant database environment, a customer relationship management (CRM) environment, etc. Various embodiments of on-demand service environments are described below.

In one embodiment, analytics agent 180 functions to gather utilization information from various hosts and can use this information to make load predications and/or provide this information to one or more load prediction agents to be used in making load predictions. Information can include, for example, historical statistical information such as cache utilization tracked by time of day. Any type of analytics can be utilized by analytics agent 180.

Figure 2:
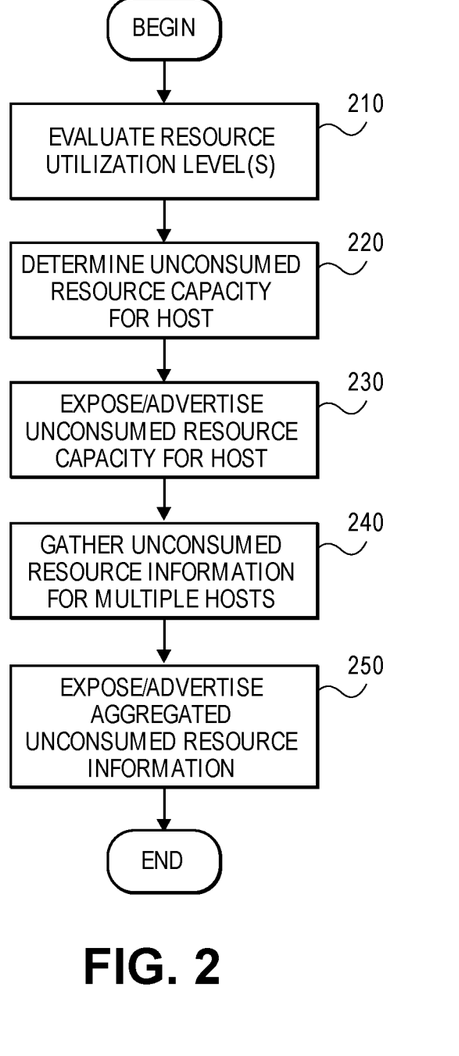
FIG. 2 is a flow diagram of one embodiment of a technique for monitoring under-utilized resources.

FIG. 2 is a flow diagram of one embodiment of a technique for monitoring under-utilized resources. The operations described with respect to FIG. 2 can be performed by one or more scavenger agents and/or one or more aggregating allocation agents. Resource utilization is evaluated, 210. As discussed above, scavenger agents and/or other entities evaluate or determine utilization levels for one or more resources of a host system. Resources can include, for example, memory/storage/cache capacity, processor bandwidth, memory system bandwidth, network (wired or wireless) bandwidth, battery power, cryptographic processing, etc.

The unconsumed portion/capacity of the one or more resources can be determined, 220. For example, the scavenger agent can determine that the host hard drive is 30% used and that drive accesses occur infrequently. With that type of information, the scavenger agent can determine that the hard drive is 70% unutilized and that some percentage of memory bandwidth is unutilized. Similar types of information can be determined for various resources within the host system.

The unconsumed/available resource capacity can be exposed or advertised, 230. In one embodiment, this information is provided to a single agent that gathers resource utilization information from multiple host systems. In another embodiment, the scavenging agent can provide information for the local host system to one or more scavenging agents of other host systems.

Information for unconsumed resources from multiple hosts can be gathered, 240. As discussed above, this information can be gathered by one coordinating/aggregating agent or can be gathered by multiple agents (e.g., the scavenging agents). The unconsumed resource information from multiple hosts can be aggregated (or otherwise organized) and exposed or advertised to one or more of the host systems, 250.

Figure 3:
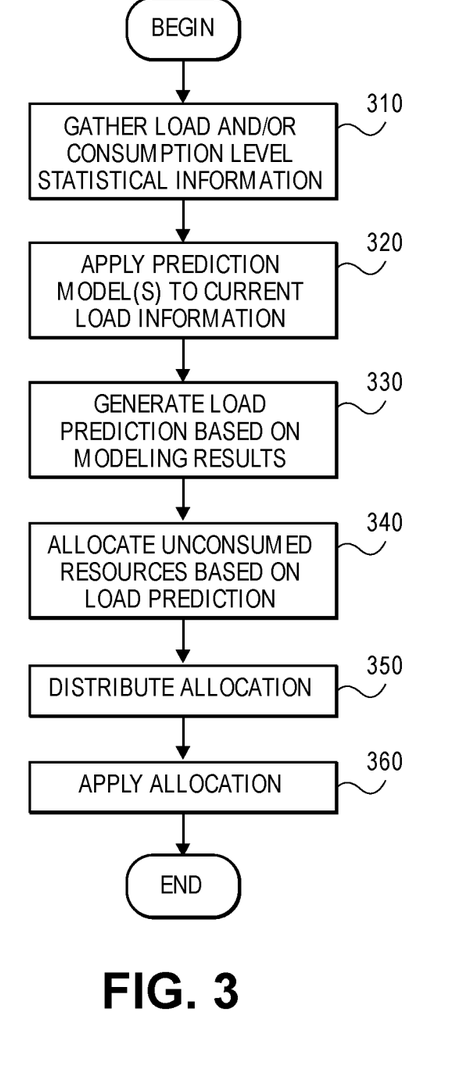
FIG. 3 is a flow diagram of one embodiment of a technique for performing load prediction analytics.

FIG. 3 is a flow diagram of one embodiment of a technique for performing load prediction analytics. In one embodiment, the operations of FIG. 3 are performed by an analytics agent that gathers resource utilization information from multiple scavenger agents; however, other configurations can also be supported.

Resource load and/or consumption and/or utilization statistical information are gathered, 310. In one embodiment, the statistical information can be gathered from multiple host systems; however, in other embodiments, statistical gathering and/or analysis can be done on a host-by-host basis.

Prediction modeling can be applied to load information, 320. In one embodiment, machine learning techniques (e.g., predictive analytics) can be utilized to predict loads for one or more resources for a selected period of time.

Load prediction information is generated based on the modeling results, 330. In one embodiment, load predications are made for resources corresponding to multiple host systems within the environment.

Resources are allocated for the selected period of time based on the load predictions, 340. For example, storage capacity on a hard drive of one host system can have a portion allocated to another host system for use until the first host system requires more storage capacity. Multiple types of resources can be managed and allocated in a similar manner. Allocation can be performed by a single coordinating agent or can be determined by host systems as they receive load prediction information.

Allocation information can be distributed, 350. If allocations are managed by a single coordinating agent, assignments and corresponding instructions/directions can be distributed by the coordinating agent. If allocations are performed in a distributed manner, host systems may claim resources of other host systems and then notify one or more host systems of the claim. Other strategies can also be employed. Allocations can be applied, 360 for some period of time.

In one embodiment, the techniques described herein can be performed within an on-demand database service environment. The techniques can also be performed across, for example, disparate heterogeneous environments.

Figure 4:
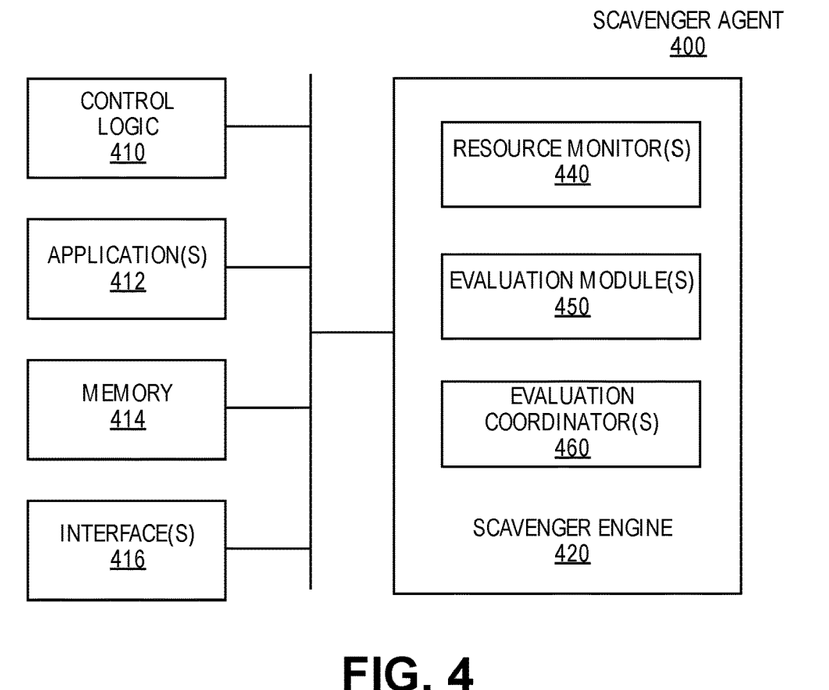
FIG. 4 is a block diagram of one embodiment of a scavenger agent that can operate as described herein.

FIG. 4 is a block diagram of one embodiment of a scavenger agent that can operate as described herein. Scavenger agent 400 includes control logic 410, which implements logical functional control to direct operation of scavenger agent 400, and/or hardware associated with directing operation of scavenger agent 400. Logic may be hardware logic circuits and/or software routines. In one embodiment, scavenger agent 400 includes one or more applications 412, which represent code sequences and/or programs that provide instructions to control logic 410.

Scavenger agent 400 includes memory 414, which represents a memory device and/or access to a memory resource for storing data and/or instructions. Memory 414 may include memory local to scavenger agent 400, as well as, or alternatively, including memory of the host system on which scavenger agent 400 resides. Scavenger agent 400 also includes one or more interfaces 416, which represent access interfaces to/from (an input/output interface) scavenger agent 400 with regard to entities (electronic or human) external to scavenger agent 400.

Scavenger agent 400 also includes scavenger engine 420, which represents one or more functions or module that enable scavenger agent 400 to provide the scavenging functionality as described above. The example of FIG. 4 provides several modules that may be included in scavenger engine 420; however, different and/or additional modules may also be included. Example modules that may be involved in providing the resource scavenging functionality include resource monitor(s) 440, evaluation module(s) 450 and evaluation coordinator 460.

In one embodiment, resource monitor(s) 440 operate to monitor/check utilization of one or more resources including, for example, memory/storage/cache capacity, processor bandwidth, memory system bandwidth, network (wired or wireless) bandwidth, battery power, cryptographic processing, etc. Resource monitor(s) 440 can be utilized to monitor any number or combination of host systems having resources that can be scavenged as described herein.

In one embodiment, evaluation module(s) 450 is/are communicatively coupled with resource monitor(s) 440 to receive utilization information from resource monitor(s) 440. Resource monitor(s) 440 can perform various types of analysis on the utilization information that can be used to provide relevant utilization metrics. For example, evaluation monitor(s) 450 can determine a utilization percentage by a thread/process running on the host system for a memory device. Other types of analysis can also be performed.

In one embodiment, evaluation coordinator(s) 460 is/are communicatively coupled with at least evaluation module(s) 450 to receive utilization and/or other information about resource utilization. In one embodiment, evaluation coordinator(s) 460 operate to provide consistent resource utilization information by coordinating resource information gathering and evaluation by scavenger agent 400.

Figure 5:
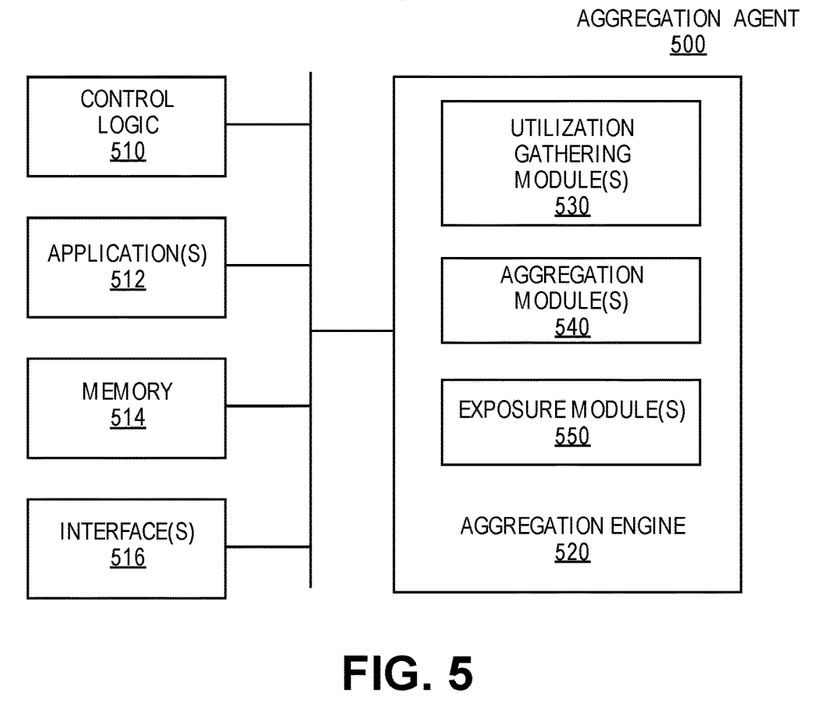
FIG. 5 is a block diagram of one embodiment of an aggregation agent that can operate as described herein.

FIG. 5 is a block diagram of one embodiment of an aggregation agent that can operate as described herein. Aggregation agent 500 includes control logic 510, which implements logical functional control to direct operation of aggregation agent 500, and/or hardware associated with directing operation of aggregation agent 500. Logic may be hardware logic circuits and/or software routines. In one embodiment, aggregation agent 500 includes one or more applications 512, which represent code sequences and/or programs that provide instructions to control logic 510.

Aggregation agent 500 includes memory 514, which represents a memory device and/or access to a memory resource for storing data and/or instructions. Memory 514 may include memory local to aggregation agent 500, as well as, or alternatively, including memory of the host system on which aggregation agent 500 resides. Aggregation agent 500 also includes one or more interfaces 516, which represent access interfaces to/from (an input/output interface) aggregation agent 500 with regard to entities (electronic or human) external to aggregation agent 500.

Aggregation agent 500 also includes aggregation engine 520, which represents one or more functions or modules that enable aggregation agent 500 to provide the scavenging and/or aggregation functionality as described above. The example of FIG. 5 provides several modules that may be included in aggregation engine 520; however, different and/or additional modules may also be included. Example modules that may be involved in providing the resource scavenging and/or aggregation functionality include utilization gathering module(s) 530, aggregation module(s) 540 and exposure module(s) 550.

In one embodiment, utilization gathering module(s) 530 are coupled to request and/or receive utilization information from one or more scavenger agents (e.g., scavenger agent 400). This information can be gathered continuously or periodically (e.g., hourly, daily).

In one embodiment, aggregation module(s) 540 is/are communicatively coupled with utilization gathering module(s) 530. Aggregation module(s) 540 operate toaggregate utilization and/or availability information for resources (or types of resources), In one embodiment, utilization and/or availability information can be aggregated for resource types (e.g., hard drives, processors). In another embodiment, utilization and/oravailability information can be aggregated for classes of resources within the resource types. For example, utilization and/or availability information can be aggregated for 5400 RPM hard disks or 2.5+GHz processors. Aggregating functionality is described in greater detail in U.S. patent application Ser. No. 15/282,335, filed Sep. 30, 2016 and entitled "TECHNIQUES AND ARCHITECTURES FOR EFFICIENT ALLOCATION OF UNDER-UTILIZED RESOURCES," by James Walsh and Sameer Tiwari, which is incorporated by reference herein.

In one embodiment, exposure module(s) 550 is/are coupled with at least aggregation module(s) 540. Exposure module(s) 550 operate to provide availability information outside of aggregation agent 500, for example, to one or more computing devices within a larger computing platform/environment.

Figure 6:
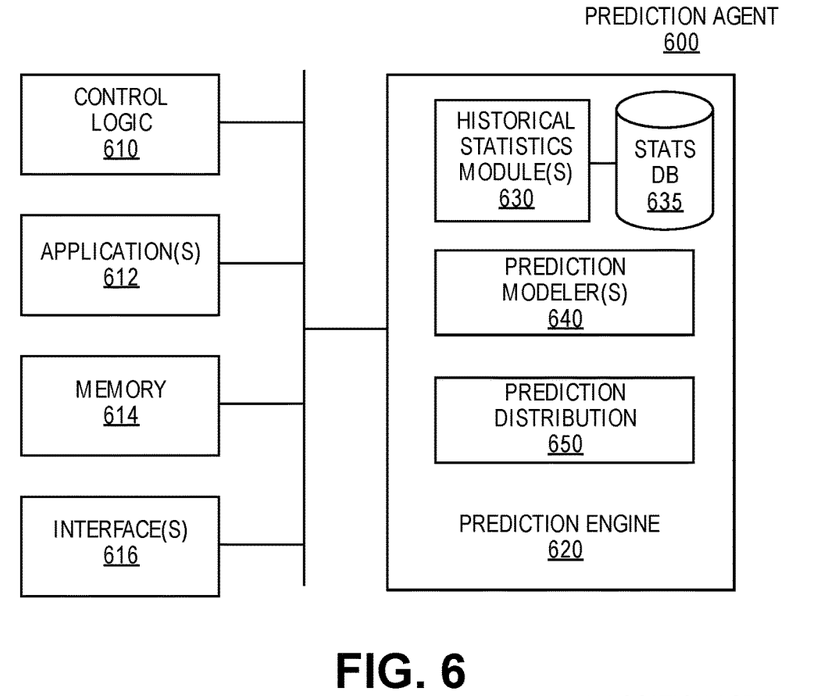
FIG. 6 is a block diagram of one embodiment of a prediction agent that can operate as described herein.

FIG. 6 is a block diagram of one embodiment of a prediction agent that can operate as described herein. Prediction agent 600 includes control logic 610, which implements logical functional control to direct operation of prediction agent 600, and/or hardware associated with directing operation of prediction agent 600. Logic may be hardware logic circuits and/or software routines. In one embodiment, prediction agent 600 includes one or more applications 612, which represent code sequence and/or programs that provide instructions to control logic 610.

Prediction agent 600 includes memory 614, which represents a memory device and/or access to a memory resource for storing data and/or instructions. Memory 614 may include memory local to prediction agent 600, as well as, or alternatively, including memory of the host system on which prediction agent 600 resides. Prediction agent 600 also includes one or more interfaces 616, which represent access interfaces to/from (an input/output interface) prediction agent 600 with regard to entities (electronic or human) external to prediction agent 600.

Prediction agent 600 also includes prediction engine 620, which represents one or more functions or modules that enable prediction agent 600 to provide the scavenging and/or aggregation functionality as described above. The example of FIG. 6 provides several modules that may be included in prediction engine 620; however, different and/or additional modules may also be included. Example modules that may be involved in providing the resource prediction functionality include historical statistics module(s) 630, prediction modeler(s) 640 and prediction distributor(s) 650.

In one embodiment, historical statistics module(s) 630 gather and/or generate statistical information related to resource availability and/or utilization. Statistical information can be stored in statistics database 635. Statistical information can be gathered from, for example, scavenger agent 400 and/or aggregation agent 500.

Prediction modeler(s) 640 operate to utilize historical statistical information and current information to generate predictions of resource utilization and/or resource availability. Various predictive analytics techniques can be utilized to perform this operation.

Prediction distributor(s) 650 operate to distribute prediction information to one or more destinations including, for example, computing platforms that may attempt to utilize available resources from other systems within the computing environment.

Figure 7:
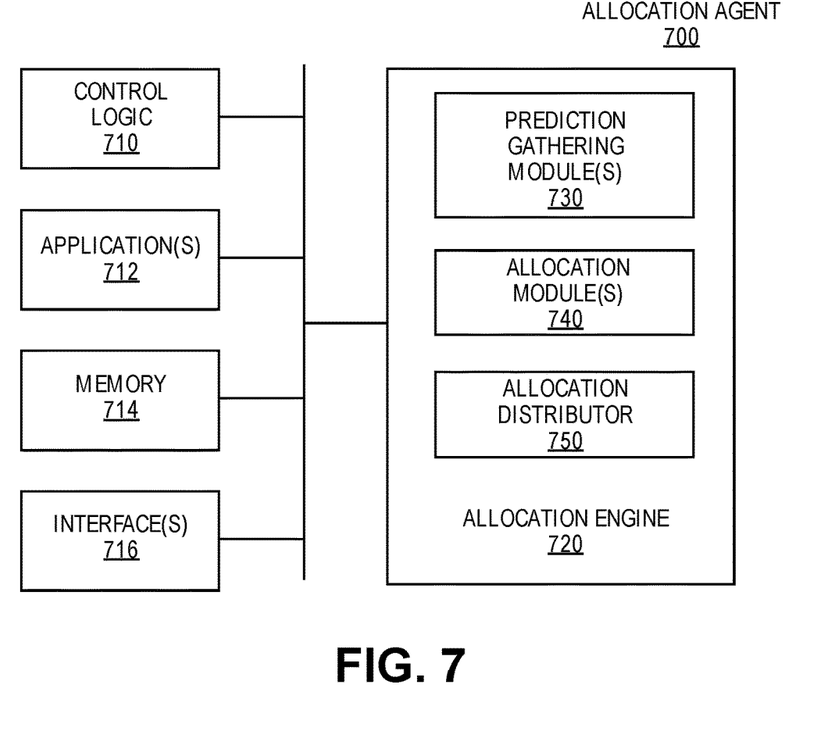
FIG. 7 is a block diagram of one embodiment of an allocation agent that can operate as described herein.

FIG. 7 is a block diagram of one embodiment of an allocation agent that can operate as described herein. Allocation agent 700 includes control logic 710, which implements logical functional control to direct operation of allocation agent 700, and/or hardware associated with directing operation of allocation agent 700. Logic may be hardware logic circuits and/or software routines. In one embodiment, allocation agent 700 includes one or more applications 712, which represent code sequences and/or programs that provide instructions to control logic 710.

Allocation agent 700 includes memory 714, which represents a memory device and/or access to a memory resource for storing data and/or instructions. Memory 714 may include memory local to allocation agent 700, as well as, or alternatively, including memory of the host system on which allocation agent 700 resides. Allocation agent 700 also includes one or more interfaces 716, which represent access interfaces to/from (an input/output interface) allocation agent 700 with regard to entities (electronic or human) external to allocation agent 700.

Allocation agent 700 also includes allocation engine 720, which represents one or more functions or modules that enable allocation agent 700 to provide the scavenging and/or aggregation functionality as described above. The example of FIG. 7 provides several modules that may be included in allocation engine 720; however, different and/or additional modules may also be included. Example modules that may be involved in providing the resource allocation functionality include prediction gathering module(s) 730, allocation module(s) 740 and allocation distributor(s) 750.

In one embodiment, prediction gathering module(s) 730 operate to gather prediction information from, for example, prediction agent 600. Prediction information can be gathered from any number of sources capable of providing prediction information.

In one embodiment, allocation module(s) 740 is/are coupled with prediction gathering module(s) 730 to receive prediction information for various resources within the host environment. In one embodiment, allocation module(s) 740 operate to allocate underutilized and/or unutilized resources to other hosts/systems as described in greater detail above.

Allocation distributor(s) 750 operate to distribute allocation information to one or more destinations including, for example, computing platforms that may attempt to utilize available resources from other systems within the computing environment. In one embodiment, platforms that receive the allocation information follow the allocations for a specific length of time by either providing resources to other platforms/hosts or utilizing resources of other platforms/hosts.

Figure 8:
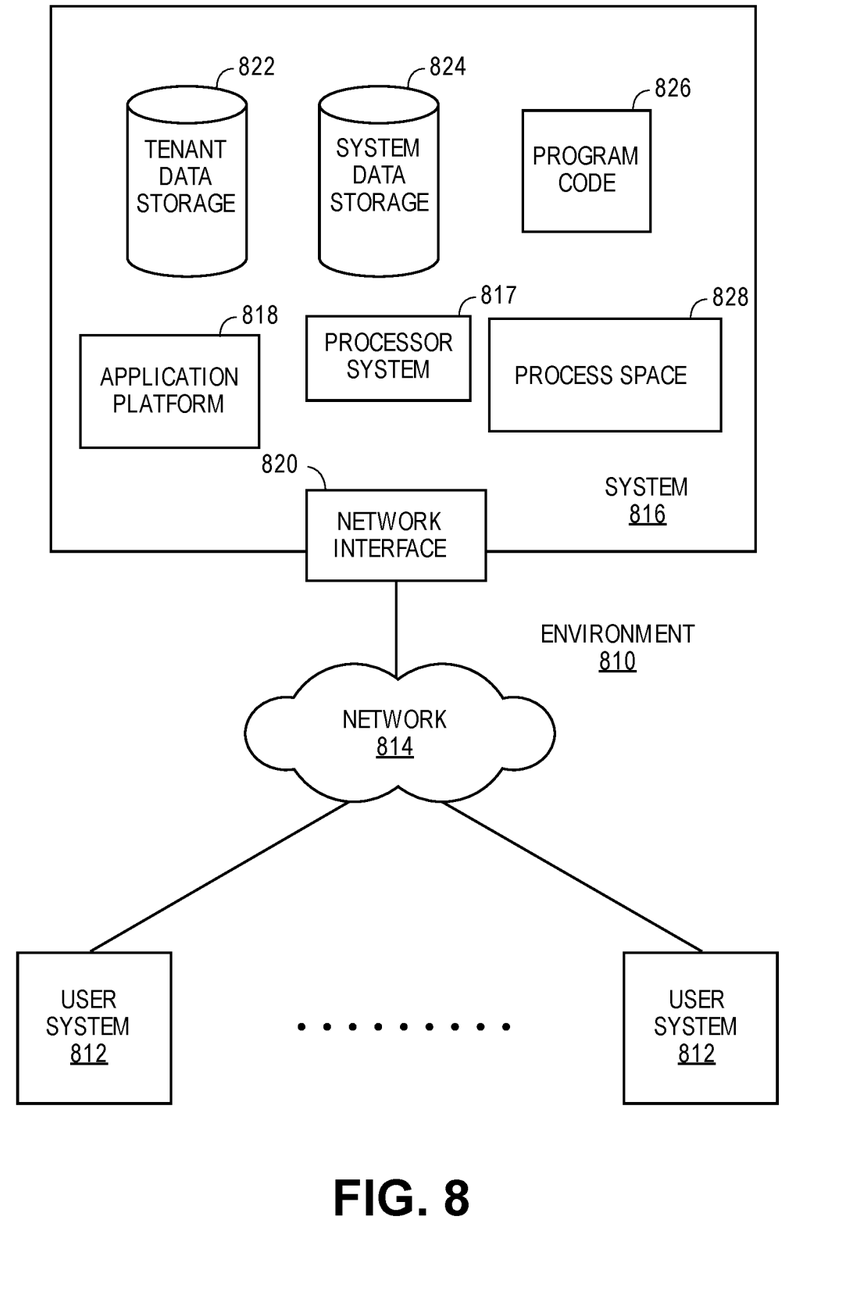
FIG. 8 illustrates a block diagram of an environment where an on-demand database service might be used.

FIG. 8 illustrates a block diagram of an environment 810 wherein an on-demand database service might be used. Environment 810 may include user systems 812, network 814, system 816, processor system 817, application platform 818, network interface 820, tenant data storage 822, system data storage 824, program code 826, and process space 828. In other embodiments, environment 810 may not have all of the components listed and/or may have other elements instead of, or in addition to, those listed above.

Environment 810 is an environment in which an on-demand database service exists. User system 812 may be any machine or system that is used by a user to access a database user system. For example, any of user systems 812 can be a handheld computing device, a mobile phone, a laptop computer, a workstation, and/or a network of computing devices. As illustrated in herein FIG. 8 (and in more detail in FIG. 9) user systems 812 might interact via a network 814 with an on-demand database service, which is system 816.

An on-demand database service, such as system 816, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 816" and "system 816" will be used interchangeably herein. A database image may include one or more database objects. A relational database management system (RDMS) or the equivalent may execute storage and retrieval of information against the database object(s). Application platform 818 may be a framework that allows the applications of system 816 to run, such as the hardware and/or software, e.g., the operating system. In an embodiment, on-demand database service 816 may include an application platform 818 that enables creation, managing and executing one or more applications developed by the provider of the on-demand database service, users accessing the on-demand database service via user systems 812, or third party application developers accessing the on-demand database service via user systems 812.

The users of user systems 812 may differ in their respective capacities, and the capacity of a particular user system 812 might be entirely determined by permissions (permission levels) for the current user. For example, where a salesperson is using a particular user system 812 to interact with system 816, that user system has the capacities allotted to that salesperson. However, while an administrator is using that user system to interact with system 816, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 814 is any network or combination of networks of devices that communicate with one another. For example, network 814 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 812 might communicate with system 816 using TCP/IP and, at a higher network level, use other common Internet protocols to communicate, such as HTTP, FTP, AFS, WAP, etc. In an example where HTTP is used, user system 812 might include an HTTP client commonly referred to as a "browser" for sending and receiving HTTP messages to and from an HTTP server at system 816. Such an HTTP server might be implemented as the sole network interface between system 816 and network 814, but other techniques might be used as well or instead. In some implementations, the interface between system 816 and network 814 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 816, shown in FIG. 8, implements a web-based customer relationship management (CRM) system. For example, in one embodiment, system 816 includes application servers configured to implement and execute CRM software applications as well as provide related data, code, forms, webpages and other information to and from user systems 812 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 816 implements applications other than, or in addition to, a CRM application. For example, system 816 may provide tenant access to multiple hosted (standard and custom) applications, including a CRM application. User (or third party developer) applications, which may or may not include CRM, may be supported by the application platform 818, which manages creation, storage of the applications into one or more database objects and executing of the applications in a virtual machine in the process space of the system 816.

One arrangement for elements of system 816 is shown in FIG. 8, including a network interface 820, application platform 818, tenant data storage 822 for tenant data 823, system data storage 824 for system data 825 accessible to system 816 and possibly multiple tenants, program code 826 for implementing various functions of system 816, and a process space 828 for executing MTS system processes and tenant-specific processes, such as running applications as part of an application hosting service. Additional processes that may execute on system 816 include database indexing processes.

Several elements in the system shown in FIG. 8 include conventional, well-known elements that are explained only briefly here. For example, each user system 812 could include a desktop personal computer, workstation, laptop, PDA, cell phone, or any wireless access protocol (WAP) enabled device or any other computing device capable of interfacing directly or indirectly to the Internet or other network connection. User system 812 typically runs an HTTP client, e.g., a browsing program, such as Edge from Microsoft, Safari from Apple, Chrome from Google, or a WAP-enabled browser in the case of a cell phone or other wireless device, or the like, allowing a user (e.g., subscriber of the multi-tenant database system) of user system 812 to access, process and view information, pages and applications available to it from system 816 over network 814. Each user system 812 also typically includes one or more user interface devices, such as a keyboard, a mouse, touch pad, touch screen, pen or the like, for interacting with a graphical user interface (GUI) provided by the browser on a display (e.g., a monitor screen, LCD display, etc.) in conjunction with pages, forms, applications and other information provided by system 816 or other systems or servers. For example, the user interface device can be used to access data and applications hosted by system 816, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 812 and all of its components are operator configurable using applications, such as a browser, including computer code run using a central processing unit such as an Intel Core series processor or the like. Similarly, system 816 (and additional instances of an MTS, where more than one is present) and all of their components might be operator configurable using application(s) including computer code to run using a central processing unit such as processor system 817, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 816 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, solid state drives (SSD), nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 816 is configured to provide webpages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 9:
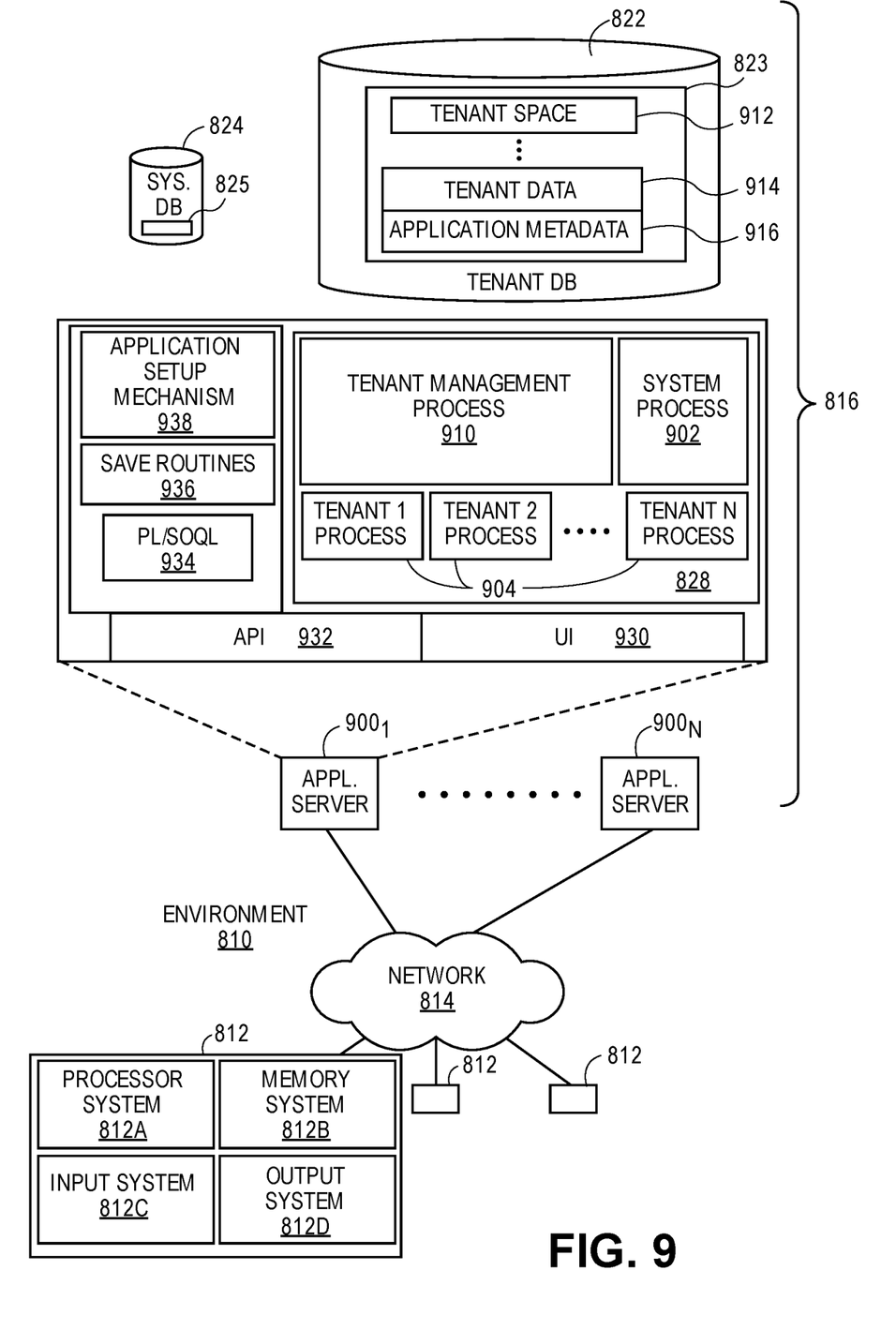
FIG. 9 illustrates a block diagram of another environment where an on-demand database service might be used.

FIG. 9 also illustrates environment 810. However, in FIG. 9 elements of system 816 and various interconnections in an embodiment are further illustrated. FIG. 9 shows that user system 812 may include processor system 812A, memory system 812B, input system 812C, and output system 812D.

FIG. 9 shows network 814 and system 816. FIG. 9 also shows that system 816 may include tenant data storage 822, tenant data 823, system data storage 824, system data 825, User Interface (UI) 930, Application Program Interface (API) 932, PL/SOQL 934, save routines 936, application setup mechanism 938, applications servers 900₁-900ₙ, system process space 902, tenant process spaces 904, tenant management process space 910, tenant storage area 912, user storage 914, and application metadata 916. In other embodiments, environment 810 may not have the same elements as those listed above and/or may have other elements instead of, or in addition to, those listed above.

User system 812, network 814, system 816, tenant data storage 822, and system data storage 824 were discussed above in FIG. 8. Regarding user system 812, processor system 812A may be any combination of one or more processors. Memory system 812B may be any combination of one or more memory devices, short term, and/or long term memory. Input system 812C may be any combination of input devices, such as one or more keyboards, mice, trackballs, scanners, cameras, and/or interfaces to networks. Output system 812D may be any combination of output devices, such as one or more monitors, printers, and/or interfaces to networks. As shown by FIG. 9, system 816 may include a network interface 820 (of FIG. 8) implemented as a set of HTTP application servers 900, an application platform 818, tenant data storage 822, and system data storage 824. Also shown is system process space 902, including individual tenant process spaces 904 and a tenant management process space 910. Each application server 900 may be configured to tenant data storage 822 and the tenant data 823 therein, and system data storage 824 and the system data 825 therein to serve requests of user systems 812. The tenant data 823 might be divided into individual tenant storage areas 912, which can be either a physical arrangement and/or a logical arrangement of data. Within each tenant storage area 912, user storage 914 and application metadata 916 might be similarly allocated for each user. For example, a copy of a user's most recently used (MRU) items might be stored to user storage 914. Similarly, a copy of MRU items for an entire organization that is a tenant might be stored to tenant storage area 912. A UI 930 provides a user interface and an API 932 provides an application programmer interface to system 816 resident processes to users and/or developers at user systems 812. The tenant data and the system data may be stored in various databases, such as one or more Oracle™ databases.

Application platform 818 includes an application setup mechanism 938 that supports application developers' creation and management of applications, which may be saved as metadata into tenant data storage 822 by save routines 936 for execution by subscribers as one or more tenant process spaces 904 managed by tenant management process 910 for example. Invocations to such applications may be coded using PL/SOQL 934 that provides a programming language style interface extension to API 932. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service," issued Jun. 1, 2010 to Craig Weissman, which is incorporated in its entirety herein for all purposes. Invocations to applications may be detected by one or more system processes, which manage retrieving application metadata 916 for the subscriber making the invocation and executing the metadata as an application in a virtual machine.

Each application server 900 may be communicably coupled to database systems, e.g., having access to system data 825 and tenant data 823, via a different network connection. For example, one application server $900_1$ might be coupled via the network 814 (e.g., the Internet), another application server $900_{N-1}$ might be coupled via a direct network link, and another application server $900_N$ might be coupled by yet a different network connection. Transfer Control Protocol and Internet Protocol (TCP/IP) are typical protocols for communicating between application servers 900 and the database system. However, it will be apparent to one skilled in the art that other transport protocols may be used to optimize the system depending on the network interconnect used.

In certain embodiments, each application server 900 is configured to handle requests for any user associated with any organization that is a tenant. Because it is desirable to be able to add and remove application servers from the server pool at any time for any reason, there is preferably no server affinity for a user and/or organization to a specific application server 900. In one embodiment, therefore, an interface system implementing a load balancing function (e.g., an F5 BIG-IP load balancer) is communicably coupled between the application servers 900 and the user systems 812 to distribute requests to the application servers 900. In one embodiment, the load balancer uses a least connections algorithm to route user requests to the application servers 900. Other examples of load balancing algorithms, such as round robin and observed response time, also can be used. For example, in certain embodiments, three consecutive requests from the same user could hit three different application servers 900, and three requests from different users could hit the same application server 900. In this manner, system 816 is multi-tenant, wherein system 816 handles storage of, and access to, different objects, data and applications across disparate users and organizations.

As an example of storage, one tenant might be a company that employs a sales force where each salesperson uses system 816 to manage their sales process. Thus, a user might maintain contact data, leads data, customer follow-up data, performance data, goals and progress data, etc., all applicable to that user's personal sales process (e.g., in tenant data storage 822). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 816 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 816 might also maintain system level data usable by multiple tenants or other data. Such system level data might include industry reports, news, postings, and the like that are sharable among tenants.

In certain embodiments, user systems 812 (which may be client systems) communicate with application servers 900 to request and update system-level and tenant-level data from system 816 that may require sending one or more queries to tenant data storage 822 and/or system data storage 824. System 816 (e.g., an application server 900 in system 816) automatically generates one or more SQL statements (e.g., one or more SQL queries) that are designed to access the desired information. System data storage 824 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method, comprising:
   determining, by one or more servers, based at least in part on a first advertisement transmitted by a first computing system of two or more computing systems, a first utilization level for a first individual resource of a first set of one or more individual resources within the first computing system, the first utilization level indicating an unconsumed capacity for the first individual resource, the first individual resource being a first resource type;
   determining, by the one or more servers: based at least in part on a second advertisement transmitted by a second computing system of the two or more computing systems, a second utilization level for a second individual resource of a second set of one or more individual resources within the second computing system, the second individual resource being the first resource type;
   gathering, by the one or more servers, aggregate resource availability information associated with the two or more computing systems based, at least in part, on the first utilization level for the first individual resource and the second utilization level for the second individual resource, the aggregate resource availability information including aggregated resource information associated with the first resource type;
   generating, by the one or more servers, predicted load information associated with the two or more computing systems based, at least in part, on the aggregate resource availability information, the predicted load information indicating a predicted load for the first individual resource for a first period of time and a predicted load for the second individual resource for the first period of time; and
   allocating, by the one or more servers for the first period of time, a portion of the first individual resource to the second computing system based, at least in part, on the predicted load information,
   wherein allocating the portion of the first individual resource to the second computing system is performed responsive to processing a request from the second computing system, the portion of the first individual resource being allocated to the second computing system until it is needed by the first computing system.

2. The method of claim 1, wherein the aggregate resource availability information associated with the two or more computing systems comprises at least virtual memory capacity.

3. The method of claim 1, wherein the aggregate resource availability information associated with the two or more computing systems comprises at least physical memory capacity.

4. The method of claim 1, wherein the aggregate resource availability information associated with the two or more computing systems comprises at least virtual processor capacity.

5. The method of claim 1, wherein the aggregate resource availability information associated with the two or more computing systems comprises at least physical processor capacity.

6. The method of claim 1, wherein the aggregate resource availability information associated with the two or more computing systems comprises at least cache memory capacity.

7. The method of claim 1, wherein the aggregate resource availability information associated with the two or more computing systems comprises at least database capacity.

8. The method of claim 1, further comprising: exposing or advertising availability of at least the portion of the first individual resource to one or more host computing systems including the second computing system.

9. A non-transitory computer-readable medium having stored thereon instructions that, when executed by one or more processors, are configurable to cause the one or more processors to:
   determine, based at least in part on a first advertisement transmitted by a first computing system of two or more computing systems, a first utilization level for a first individual resource of a first set of one or more individual resources within the first computing system, the first utilization level indicating an unconsumed capacity for the first individual resource, the first individual resource being a first resource type;
   determine, based at least in part on a second advertisement transmitted by a second computing system of the two or more computing systems, a second utilization level for a second individual resource of a second set of one or more individual resources within the second computing system, the second individual resource being the first resource type;
   gather aggregate resource availability information associated with the two or more computing systems based, at least in part, on the first utilization level for the first individual resource and the second utilization level for the second individual resource, the aggregate resource availability information including aggregated resource information associated with the first resource type;
   generate predicted load information associated with the two or more computing systems based, at least in part, on the aggregate resource availability information, the predicted load information indicating a predicted load for the first individual resource for a first period of time and a predicted load for the second individual resource for the first period of time; and
   allocate, for the first period of time, a portion of the first individual resource to the second computing system based, at least in part, on the predicted load information,
   wherein allocating the portion of the first individual resource to the second computing system is performed responsive to processing a request from the second computing system, the portion of the first individual resource being allocated to the second computing system until it is needed by the first computing system.

10. The non-transitory computer-readable medium of claim 9, wherein the aggregate resource availability information associated with the two or more computing systems comprises one or more of: virtual memory capacity, physical memory capacity, physical processor capacity or virtual processor capacity.

11. The non-transitory computer-readable medium of claim 9, wherein the aggregate resource availability information associated with the two or more computing systems comprises at least cache memory capacity.

12. The non-transitory computer-readable medium of claim 9, wherein the aggregate resource availability information associated with the two or more computing systems comprises at least database capacity.

13. A system, comprising:
   at least one hardware memory device;
   one or more hardware processors coupled with the at least one hardware memory device, the one or more hardware processors configurable to cause:

determining, based at least in part on a first advertisement transmitted by a first computing system of two or more computing systems, a first utilization level for a first individual resource of a first set of one or more individual resources within the first computing system, the first utilization level indicating an unconsumed capacity for the first individual resource, the first individual resource being a first resource type;

determining, based at least in part on a second advertisement transmitted by a second computing system of the two or more computing systems, a second utilization level for a second individual resource of a second set of one or more individual resources within the second computing system, the second individual resource being the first resource type;

gathering aggregate resource availability information associated with the two or more computing systems based, at least in part, on the first utilization level for the first individual resource and the second utilization level for the second individual resource, the aggregate resource availability information including aggregated resource information associated with the first resource type;

generating predicted load information associated with the two or more computing systems based, at least in part, on the aggregate resource availability information, the predicted load information indicating a predicted load for the first individual resource for a first period of time and a predicted load for the second individual resource for the first period of time; and allocating, for the first period of time, a portion of the first individual resource to the second computing system based, at least in part, on the predicted load information, wherein allocating the portion of the first individual resource to the second computing system is performed responsive to processing a request from the second computing system, the portion of the first individual resource being allocated to the second computing system until it is needed by the first computing system.

14. The system of claim 13, wherein the aggregate resource availability information associated with the two or more computing systems comprises at least physical memory capacity.

15. The system of claim 13, wherein the aggregate resource availability information associated with the two or more computing systems comprises at least cache memory capacity.

16. The system of claim 13, wherein the aggregate resource availability information associated with the two or more computing systems comprises at least physical processor capacity.

17. The system of claim 13, wherein the aggregate resource availability information associated with the two or more computing systems comprises at least virtual processor capacity.

18. The system of claim 13 wherein the aggregate resource availability information associated with the two or more computing systems comprises at least database capacity.

* * * * *